United States Patent
Shatz

(10) Patent No.: US 6,202,304 B1
(45) Date of Patent: *Mar. 20, 2001

(54) METHOD OF MAKING A PERFORATED METAL SHEET

(76) Inventor: Solomon Shatz, P.O. Box 523, Cupertino, CA (US) 94015

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/779,459

(22) Filed: Jan. 7, 1997

Related U.S. Application Data

(63) Continuation of application No. 08/333,483, filed on Nov. 2, 1994, now Pat. No. 5,590,854.

(51) Int. Cl.[7] .................................................. B23P 17/00
(52) U.S. Cl. ........................ 29/896.6; 29/17.2; 29/558; 29/424; 204/192.32; 204/192.35
(58) Field of Search .................................. 244/198, 200, 244/204, 206, 130, 205, 207, 209, 219, 134; 29/423, 424, 896.6, 163.6, 17.1, 17.2, 558; 216/100, 102, 105; 204/192.32, 192.35

(56) References Cited

U.S. PATENT DOCUMENTS

| | | | |
|---|---|---|---|
| 1,311,160 | * 7/1919 | French | 29/896.6 X |
| 1,566,624 | * 12/1925 | Smith | 29/896.6 X |

(List continued on next page.)

FOREIGN PATENT DOCUMENTS

| | | |
|---|---|---|
| 1955163A | 5/1971 | (DE) . |
| 2541282 | * 4/1976 | (DE) ...................................... 29/424 |
| 3928681A1 | 4/1990 | (DE) . |
| 519882 | 4/1940 | (GB) . |
| 960303 | 6/1964 | (GB) . |
| 1164353 | * 9/1969 | (GB) ..................................... 244/209 |
| 0013089 | * 1/1979 | (JP) ........................................ 29/558 |
| 40531019 | * 11/1993 | (JP) ..................................... 244/209 |
| 505-310193 | 11/1993 | (JP) ..................................... 244/209 |

OTHER PUBLICATIONS

"Research In Natural Laminar Flow and Laminar–Flow Control", NASA Conference Publication 2487, Part 1; released Dec. 31, 1989.

"Laminar Flow Control Leading Edge Glove Flight Test Article Development", NASA Contractor Report 172137.

"Evaluation of Laminar Flow Control Systems Concepts For Subsonic Commercial Transport Aircraft", NASA Contractor Report 159251.

*Scientific American*, Nov. 1933, "An Oiled Curtain to Break Ice", p. 228.

*Primary Examiner*—S. Thomas Hughes
*Assistant Examiner*—Marc W. Butler
(74) *Attorney, Agent, or Firm*—Limbach & Limbach, LLP

(57) ABSTRACT

A movable sheet overlying a wing is disclosed that creates laminar flow over its exposed surface. The movable sheet serves as an integral, retractable shield for protecting a suction support structure of a wing against contamination, and also serves as a movable, conductive substrate for deicing by means of electrical resistance or hot-gas heating. The invention includes a movable sheet that is mounted scroll-like on two motor-driven rollers. The sheet has a solid area without perforations that protects the suction support structure from contamination, and a porous area with perforations therethrough that allows boundary layer suction. The motor-driven rollers scroll the sheet to cover the suction support structure with either the solid area or the perforations of the sheet. Contact rollers at the edge of the sheet supply electrical current to resistively heat the sheet and melt any accumulated ice. The movable sheet can also be moved back and forth to dislodge the ice.

15 Claims, 10 Drawing Sheets

U.S. PATENT DOCUMENTS

| | | | |
|---|---|---|---|
| 1,652,208 | * 12/1927 | McEovy, Jr. | 29/896.6 X |
| 1,785,300 | 12/1930 | De La Tour Castelcicala | 244/206 |
| 2,028,669 | 1/1936 | Hiscock | 244/134 R |
| 2,152,053 | 3/1939 | Jenkins | 244/40 |
| 2,297,540 | 9/1942 | Driscoll | 244/134 D |
| 2,324,303 | 7/1943 | Johnson | 244/134 C |
| 2,393,635 | 1/1946 | Hubbard | 244/134 A |
| 2,399,648 | 5/1946 | Love | 244/134 |
| 2,539,222 | 1/1951 | Battaglia | 244/40 |
| 2,739,047 | * 3/1956 | Sanz | 29/424 |
| 3,147,546 | * 9/1964 | Bowman et al. | 29/424 |
| 3,204,266 | * 9/1965 | Carter, Jr. et al. | 29/558 |
| 3,325,319 | * 6/1967 | Frantzen | 29/424 X |
| 3,521,837 | * 7/1970 | Papst | 29/896.6 X |
| 3,568,296 | * 3/1971 | Cutillo et al. | 29/424 |
| 3,700,418 | * 10/1972 | Mayeda | 29/896.6 X |
| 3,774,867 | 11/1973 | Quinn | 244/40 R |
| 3,923,566 | * 12/1975 | Law | 29/424 |
| 4,114,836 | 9/1978 | Graham et al. | 244/1 N |
| 4,354,820 | * 10/1982 | Yamamoto et al. | 29/558 X |
| 4,508,295 | 4/1985 | Cattaneo et al. | 244/134 A |
| 4,522,360 | 6/1985 | Barnwell et al. | 244/204 |
| 4,539,245 | 9/1985 | Sarin et al. | 428/116 |
| 4,786,020 | 11/1988 | Franke et al. | 244/204 |
| 4,857,698 | 8/1989 | Perun | 219/121.71 |
| 5,263,667 | * 11/1993 | Horstman | 244/209 |

* cited by examiner

METHOD OF MAKING A PERFORATED METAL SHEET

This is a continuation of application Ser. No. 08/333,483, filed Nov. 2, 1994, now U.S. Pat. No. 5,590,854, issued Jan. 7, 1997.

BACKGROUND OF THE INVENTION

1. Field of the Invention

This invention relates generally to laminar flow wings and deicing devices for aircraft, and relates more particularly to a movable sheet that serves as a renewable, laminar flow suction surface, and alternatively as an integral, retractable shield for protecting a suction support structure of a wing against contamination, and that also serves as a movable, conductive substrate for deicing by means of electrical resistance or hot-gas heating and substrate movement. Furthermore, the movable sheet serves to protect the wing surface from debris impact damage and corrosion.

2. Description of the Relevant Art

Laminar flow wings have been proposed in order to reduce drag in aircraft. Laminar flow concepts include shaping the airfoil to enhance laminar flow for small wings, and active measures such as boundary layer suction for larger wings. Promoting laminar flow through suction operates on the principle of removing low energy air from the boundary layer to delay the transition from laminar to turbulent or separated flow.

A suction device for a laminar flow wing typically has a suction support structure comprising a perforated, slotted, or otherwise porous skin on the upper and/or lower surface of the wing. Boundary layer air is sucked through the suction support structure and into a vacuum plenum or manifold located within the wing. A problem that arises with such a suction device is that insects, airborne debris and ice can clog the perforations or slots in the suction support structure and thereby degrade the performance of the suction device. This problem is of concern at low and medium altitudes. Prior to the present invention, large laminar flow wings have been impractical for commercial use in part because of the difficulty in keeping clear the tiny perforations.

Another design consideration for aircraft is the need to prevent ice from accumulating on a wing. Deicing concepts include using chemicals to retard ice formation, using an inflatable or deformable wing surface to break the ice, and heating the wing surface to melt the ice and/or the interface between the ice and the wing. Presently, the chemicals used for wing deicing are toxic and cause great environmental damage. Wing heating requires large amounts of energy, and is heavy and costly. The present invention alleviates these problems.

SUMMARY OF THE INVENTION

In accordance with the illustrated preferred embodiment, the present invention improves upon prior laminar flow wing designs by providing a means for a renewable and cleanable-in-flight laminar flow suction surface and means for shielding a suction support structure against contamination from insects, ice, sand, and other airborne debris. The present invention further provides a means for deicing a wing surface through a combination of electrical resistance or hot-gas heating and physical movement to melt and dislodge accumulated ice.

The present invention is a movable sheet apparatus that has multiple applications—as a movable and retractable laminar flow surface, as a retractable shield for a laminar flow wing porous support structure, as a movable heated deicing element, as a mechanical motion ice remover, and as a replaceable wing protector. In most cases, the invention includes a movable sheet that is mounted scroll-like on two motor-driven rollers mounted within the wing. A portion of the movable sheet is exposed to the airstream passing over the wing, and it is that exposed portion of the movable sheet that interacts with the airstream and either provides laminar flow for the wing or provides the means for protecting the wing and removing ice.

As a perforated or porous primary laminar flow surface, as a movable, self-heating, electrically-conductive substrate for deicing, and alternatively as a retractable shield for a laminar flow wing, the present invention includes a movable sheet mounted like a scroll on two motor-driven rollers and positioned over a suction support structure of the wing. The movable sheet can be positioned to cover the suction support structure to shield it from airborne debris or to uncover the suction support structure to allow boundary layer suction through a perforated or porous portion of the movable sheet. The rollers are rotatably mounted within the wing and extend spanwise with respect to the wing, with one roller mounted forward of the suction support structure and the other roller mounted aft of the suction support structure. The sheet overlies the suction support structure and extends scroll-like between the two rollers, with opposite ends of the sheet engaging the rollers. In one of the preferred embodiments, the sheet has a solid area and a porous area that is permeable to air flowing therethrough. The motor-driven rollers scroll the attached sheet across the suction support structure.

A vacuum source sucks air through the suction support structure when the sheet is positioned with the porous area overlying the suction support structure. In that position, the perforations or porosity of the sheet align with the underlying perforations in the suction support structure. Air is sucked from the boundary layer by the vacuum supply to improve laminar flow characteristics. During takeoff and landing, when contamination by dust, sand, leaves, insects, ice, or other debris is most likely to happen, the sheet can be repositioned so that the solid area of the sheet overlies the suction support structure and protects it from contamination, and so that the porous area of the sheet is wound on a roller inside the wing and is protected from clogging. The solid portion of the movable sheet serves as a wing protector to protect the underlying structure. Extra sheet material can be wrapped onto the rollers so that if one area of the movable sheet becomes worn, damaged, contaminated or otherwise made inoperative, another area can be scrolled into place, thereby providing a renewable surface. The porosity of the porous area can be provided by perforations or by a material, such as a woven or composite material that is inherently porous. As an alternative, the movable sheet can have a sintered layer the overlies the perforated metal sheet. As another alternative, the movable sheet can have large cutout areas that are positioned to expose the underlying suction support structure when laminar flow is desired.

As a movable heating element for a deicer, the present invention includes a movable sheet mounted like a scroll on two motor-driven rollers and means for supplying electric power to resistively heat or supplying hot gasses to thermally heat the sheet. Electrical contact is preferably made at the edges of the sheet through contact rollers. The edges of the sheet are preferably coated with gold, copper, or other high-conductivity metal, alloy, or combination of metals to make good contact with the contact rollers. Electric power is supplied to the contact rollers and thus to the movable sheet, which resistively heats sufficiently to melt the interface between the sheet and any accumulated ice. In addition, the movable sheet can be moved by the motor-driven rollers or an inflatable bladder to dislodge the ice from the wing as a mechanical motion ice remover. Alternatively, hot engine gases are blown through the movable sheet to melt accumulated ice.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter. For example, the term "suction support structure" as applied to a wing means any structure through which air can flow, regardless of whether the wing surface has holes, slots, pores, perforations, or other feature that is permeable to air flow therethrough. Furthermore, the term "wing" is understood to mean any airfoil surface employed in an aircraft, including wings, rudders, stabilizers, canards, and the like. For this reason, resort to the claims is necessary to determine such inventive subject matter.

DETAILED DESCRIPTION OF THE PREFERRED EMBODIMENTS

FIGS. 1 through 23 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

The preferred embodiment of the present invention is a movable sheet apparatus as a primary laminar flow producing structure or for use with an underlying laminar flow wing structure and/or with a deicing system using electricity or hot gases for heating. The invention includes a movable sheet that is mounted. scroll-like on two motor-driven rollers located within the wing. The exposed area of the sheet that is between the rollers extends across and covers a portion of the exterior of the wing. The movable sheet is repositioned by rotating the rollers to expose a different area of the sheet.

Figure 1:
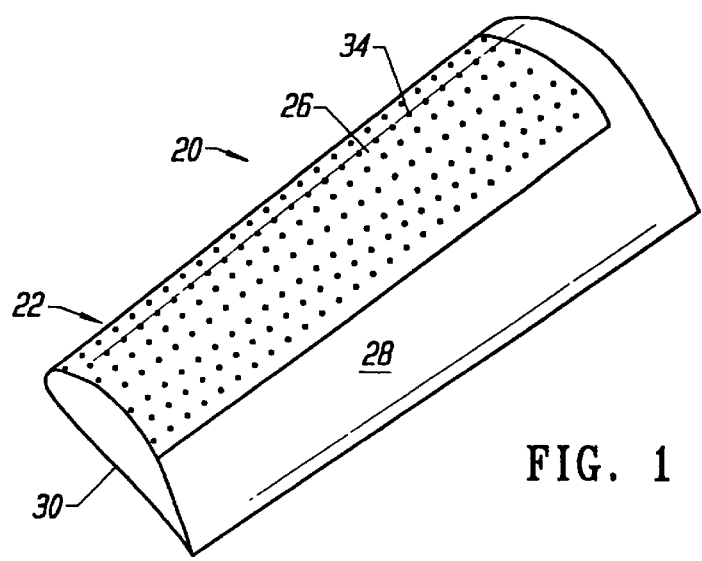
FIG. 1 is a perspective view of a wing having a movable sheet according to the present invention.

When used with a laminar flow wing 20, the present invention includes a movable sheet or shield 22 that overlies and either exposes or shields a suction support structure 24. The movable sheet 22 itself creates a laminar flow structure. As shown in FIG. 1, aporous area 26 of the sheet 22 is aligned with and exposes suction holes in the suction support structure 24, thereby permitting boundary layer air to be sucked through the sheet and suction support structure and into the interior of the wing 20 to promote laminar flow. It is understood that the suction support structure 24 as referred to herein can be any wing structure having holes, slots, pores, perforations, or other features that permit the flow of air therethrough for boundary layer suction. It is further understood that the porous area 26 of the sheet 22 can be perforated with holes, or can be constructed of an inherently porous material, or can have large-area cutouts, as described below in further detail.

Figure 2:
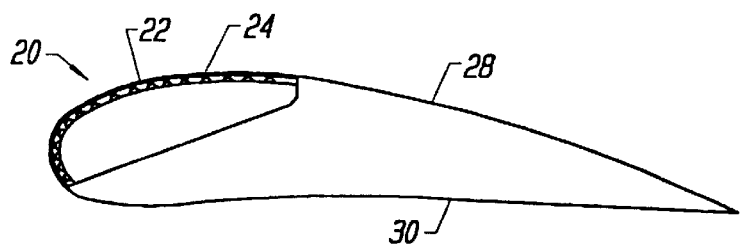
FIG. 2 is a side view, partially in section, of the wing of FIG. 1.

As shown in FIGS. 1 and 2, the suction support structure 24 of the wing 20 extends along the upper surface 28 from below the leading edge. Alternatively, the suction support structure could also extend along the bottom surface 30 of the wing, or extend further aft on the upper surface 28 of the wing, depending on where boundary layer suction is desired.

Figure 3:
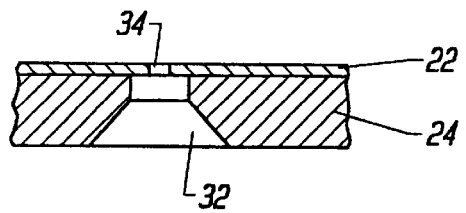
FIG. 3 is a detail view in section of a portion of an underlying perforated or porous suction support structure and an overlying movable sheet of the present invention.
Figure 4:
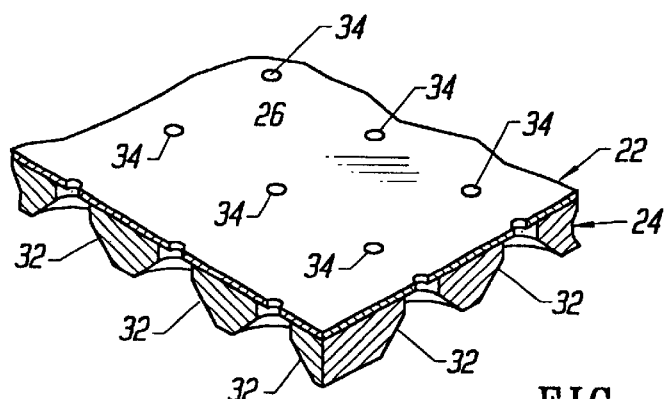
FIG. 4 is a detail view in perspective of the suction support structure and movable sheet of the present invention.

As shown in FIGS. 3 and 4, the suction support structure 24 contains many holes or perforations 32 that are aligned with corresponding holes or perforations 34 in the porous area 26 of the sheet 22. When the porous area 26 of the sheet overlies and exposes the suction support structure, the holes 32 and 34 in the suction support structure and the sheet are aligned. The holes 32 in the suction support structure 24 may be fabricated by any suitable hole-forming process, including a two-step chemical etching process. First, a larger diameter hole is partially etched from one side of the sheet, using a photolithographic technique to define the hole locations. Then, from the other side, a smaller diameter hole is etched to meet the larger hole and complete the perforation. Thus, all the holes 32 in the suction support structure 24 may be fabricated simultaneously at very low cost and with good uniformity and precision. Alternatively, the holes can be etched simultaneously from both sides. The holes 34 in the movable sheet 22 can be simultaneously fabricated by the same process. The smallest diameter of the holes 32 in the suction support structure 24 are preferably larger than the diameter of the holes 34 in the sheet 22. Appropriate sizes are about 0.002 to 0.028 inches for the smallest diameter of the holes 32 in the suction support structure, about 0.001 to 0.012 inches diameter for the holes 34 in the sheet, and a hole grid spacing of about 0.004 to 0.100 inches. The holes 32 and 34 need not be round and can be oval, rectangular, or any other shape. A porous structure may have even smaller dimensions of holes and grid spacing.

Although a single movable sheet is illustrated in the figures, each wing may have a number of contiguous movable sheets mounted side-by side, extending laterally along the wingspan.

The movable sheet 22 is preferably a sheet of nickel-chrome alloy, stainless steel, titanium alloy, or other metal or metal alloy. The movable sheet 22 can also be made from a clad, explosively bonded, or laminated combination of metals and/or plastic films or other suitable material. For example, a multi-layer sheet can have two layers of nickel-chrome alloy and stainless steel, or three layers of nickel-chrome alloy, stainless steel, and titanium alloy, or other combinations thereof. An aluminum alloy layer impregnated with silicon can be used as an inner-most layer of a clad sheet. The thickness of the sheet 22 is preferably in the range of 0.002 to 0.050 inches. The suction support structure 24 may be fabricated from titanium alloy, aluminum alloy, magnesium alloy, composite materials, polymer, ceramic, or other suitable material.

Figure 5:
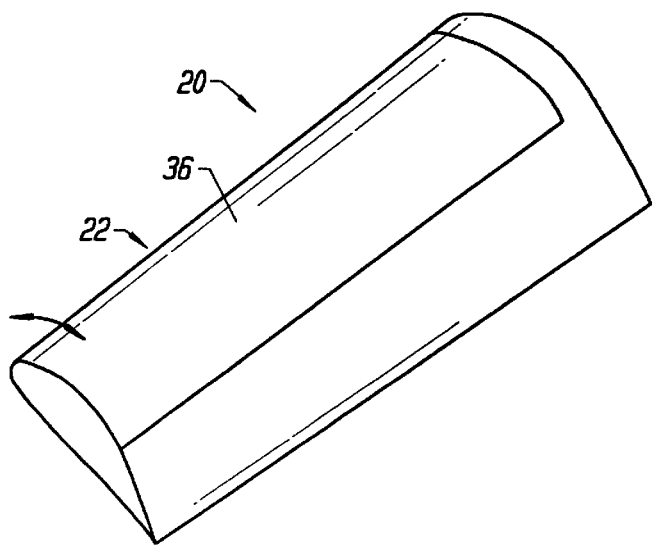
FIG. 5 is a perspective view of a wing having a movable sheet according to the present invention, with a solid portion of the sheet in a position to cover the suction support structure.

As shown in FIG. 5, the sheet 22 also includes a solid area 36 that overlies the suction support structure 24 when protection from airborne debris and icing conditions is desired. The sheet 22 can be repositioned relative to the suction support structure 24 by motor-driven rollers 38 and 40, shown in FIGS. 6 and 7. The rollers 38 and 40 are rotatably mounted within the wing 20 and extend spanwise within the wing. One roller, forward roller 38, is located mainly below and forward of the suction support structure 24, while the other roller, aft roller 40, is located mainly aft of the suction support structure. One end of the sheet 22 is attached to the forward roller 38, and the opposite end of the sheet is attached to the aft roller 40. In other words, the sheet 22 is mounted scroll-like on the rollers 38 and 40 with the sheet extending between the two rollers. An idler roller 42, rotatably mounted near the leading edge 44 of the wing, guides the sheet 22 between the leading edge and the forward roller 38. One or both of the contacting surfaces of the sheet 22 and suction support structure 24 may be coated with a low coefficient of friction material, such as teflon, PTFE, TFE, or the like. An aluminum alloy layer impregnated with silicon can be used as an inner-most layer of a clad sheet to provide a low friction surface. One of the rollers can be tensioned by a helical or other spring instead of being powered by a separate motor.

Figure 19:
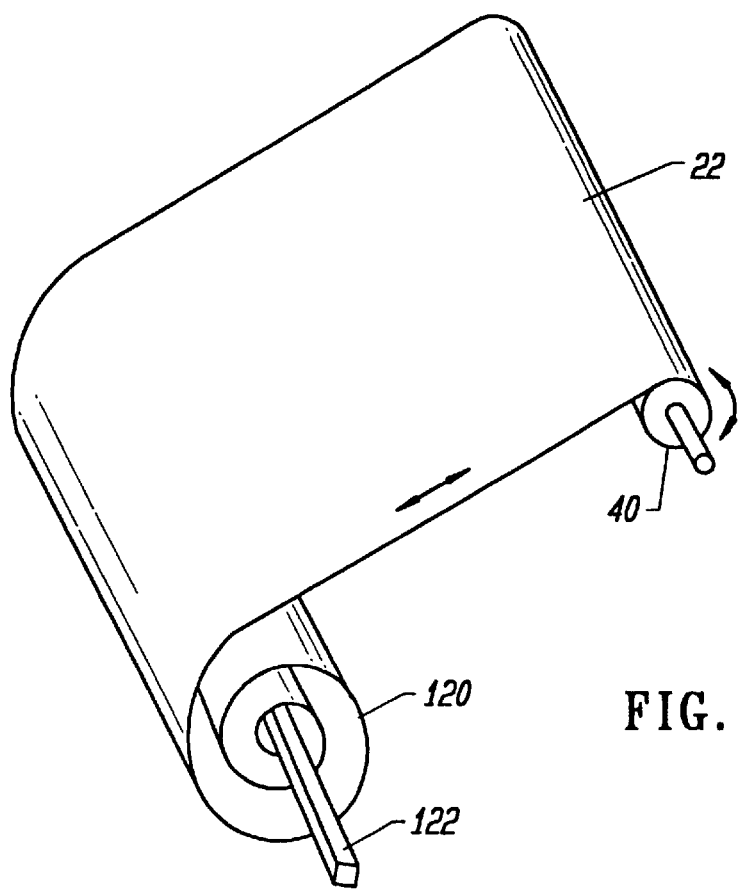
FIG. 19 is a perspective view of an alternative roller device that utilizes a helical spring.

As shown in FIG. 19, one of the rollers can be replaced by a helical spring 120. An inner edge of the spring is secured to a support bar 122. The helical spring provides tension on the movable sheet 22. When the movable sheet is to be moved to expose another area, the roller 40 is rotated and the helical spring either compresses as it feeds out the sheet material or expands as it draws in the sheet material, depending on the direction of movement of the sheet relative to the helical spring. In this embodiment, either the forward or aft roller is replaced by the helical spring 120, which still functions like a roller in the sense that the helical spring plays out or takes up the movable sheet when it is moved.

As another alternative, shown in FIG. 24, the aft roller 40 can be replaced with a linear actuator 150, such as hydraulic or air cylinders or linear electric motors. The linear actuator is attached to the aft end of the movable sheet, which is reinforced to facilitate the attachment. The forward end of the movable sheet is attached either to a roller or to a helical spring, as described above.

Returning to FIGS. 6 and 7, the sheet 22 extends between the two rollers 38 and 40, but the overall length of the sheet 22 is longer than the distance between the rollers. The unused area of the sheet is rolled onto one or both of the rollers. At a minimum, the sheet 22 has one porous area 26 and one solid area 36, each of which is large enough to cover the suction support structure 24.

As an alternative, the perforated and solid areas of the sheet 22 can each be larger than the minimum area needed to cover the suction support structure. Also alternatively, the sheet 22 can have two or more porous areas 26 alternating with two or more solid areas 36, each area being sufficient in size to cover the suction support structure 24. If one area of the movable sheet becomes worn or damaged, these alternatives permit another area to be scrolled into place, thus providing a renewable surface.

Figure 8:
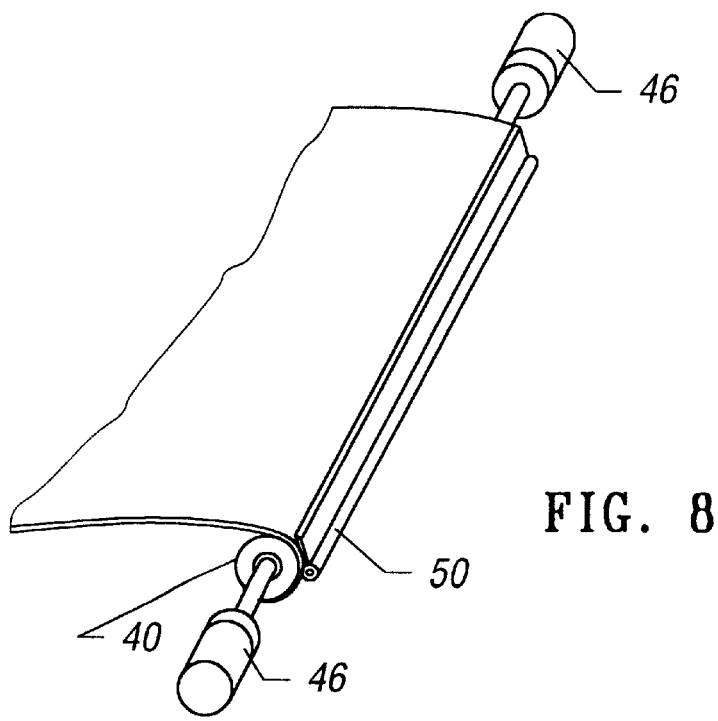
FIG. 8 is a perspective view of an aft roller and seal of the present invention.

As shown in FIG. 8, each of the rollers is driven in rotation by two geared motors 46. In order to move the sheet 22 to a different position to either cover or uncover the suction support structure 24, the two rollers 38 and 40 rotate in one direction to simultaneously feed out one area of the sheet from one roller and take in the other area of the sheet onto the other roller. A control system (not shown) controls the operation of the motors 46 so that the motors stop rotating once the sheet has been moved to the desired position. The motors 46 can also apply tension to the sheet if required to maintain contact with the surface of the wing. Of course the applied suction also keeps the sheet in contact with the underlying structure. The motors 46 can be controlled to reduce the tension in the sheet during movement in order to reduce the frictional forces created by sliding the sheet across the suction support structure. A position feedback sensor (not shown) senses encoded alignment marks 48 on the sheet 22 to determine the motion and position of the sheet 22 and feeds that information into the position control system.

As shown in FIGS. 6–9, a pivoted seal 50 is mounted in the wing aft of the aft roller 40. The seal 50 seals against the aft roller 40. The pivoted seal 50 is spring biased into contact with the sheet 22 rolled onto the aft roller 40. As the diameter of the sheet rolled onto the aft roller varies as the sheet is scrolled, the pivoted seal 50 rotates to compensate and maintain a tight seal. Another similar seal (not shown) seals the leading edge of the wing at the idler roller 42.

Figure 9:
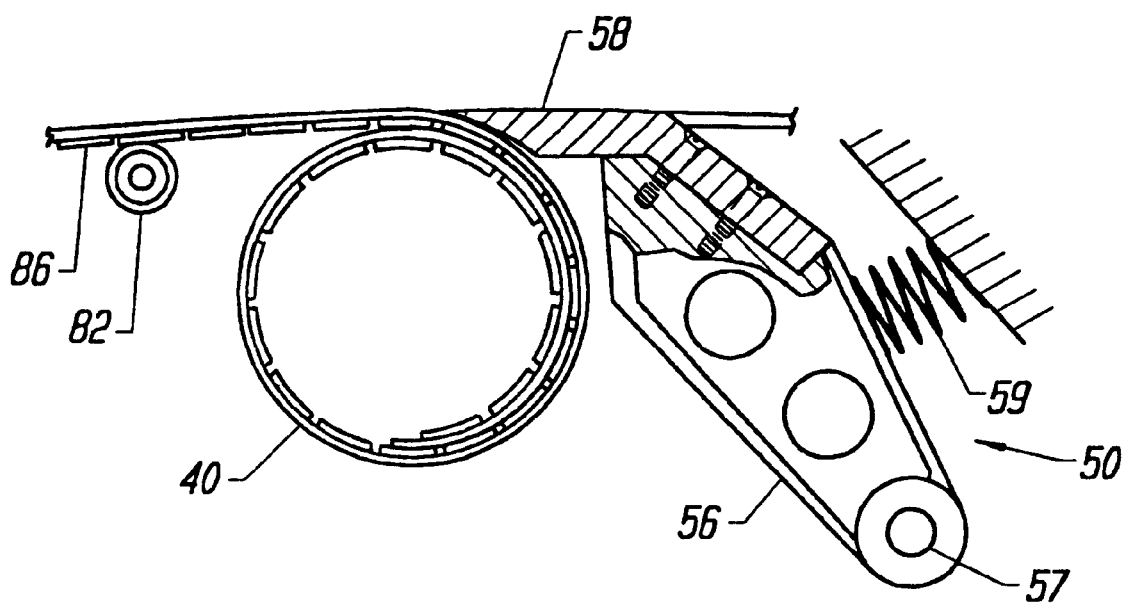
FIG. 9 is a detail view of an aft seal of the present invention.

As shown in more detail in FIG. 9, the pivoted seal 50 includes an arm 56 that is pivotally mounted to pivot 57. A blade 58 is screw mounted to the end of the arm 56 opposite the pivot 57. A compression spring 59 biases the blade 58 into contact with the surface of the sheet 22 on the roller 40. The compression spring 59 can be a wire spring, an elastomeric spring, a flat metal ribbon spring, or other suitable device that biases the blade 58 toward the roller 40.

Figure 6:
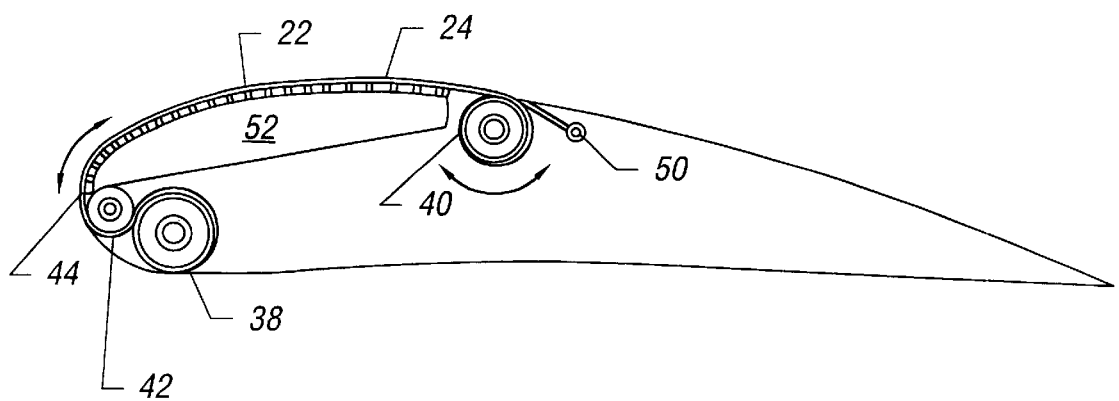
FIG. 6 is a sectional view of the wing and movable sheet of the present invention, showing motor driven rollers.
Figure 7:
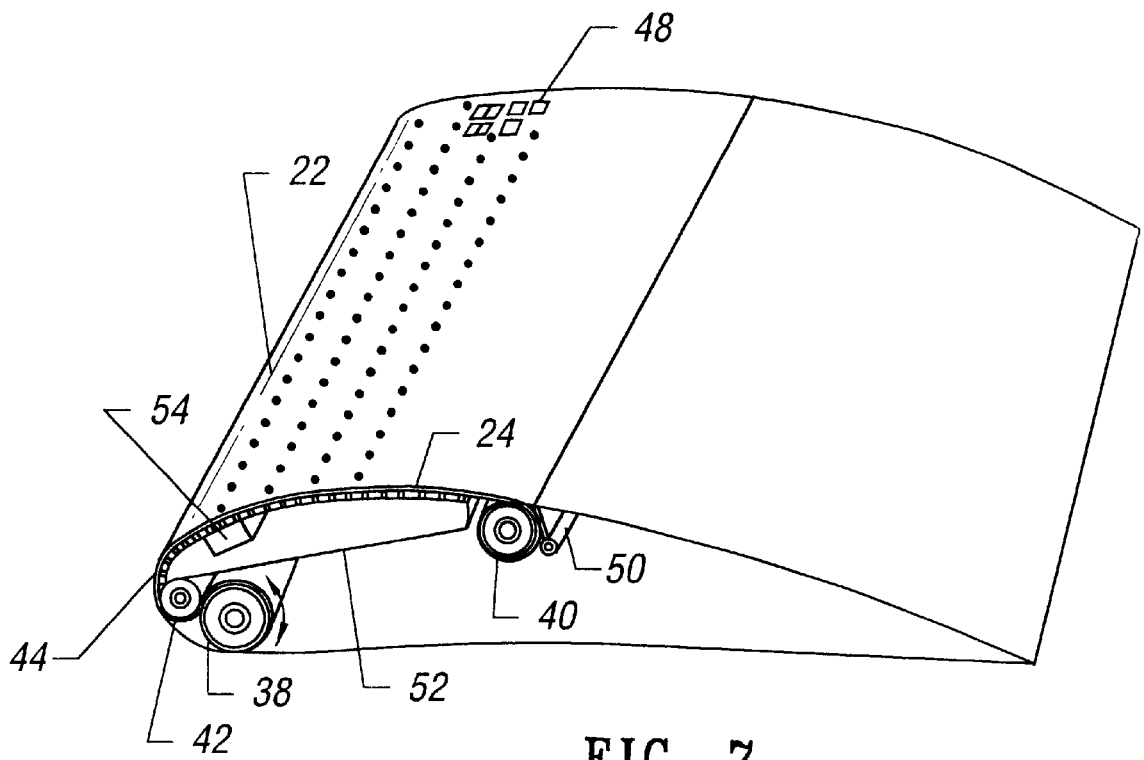
FIG. 7 is a perspective view, partially in section, of the wing and movable sheet of the present invention.

As shown in FIGS. 6 and 7, a vacuum plenum 52 is provided inside the wing adjacent to the suction support structure 24. The vacuum plenum 52, which can alternatively be a manifold, spans the spanwise length of the suction support structure 24 and provides a chamber into which flows air drawn through the holes 32 and 34 in the perforated sheet 22 and suction support structure. The vacuum plenum or manifold has a partial vacuum supplied thereto from a vacuum source, which may be a pump powered by the main engines or an auxiliary power unit, or through a venturi coupled to the main engines.

During takeoffs, insect swarms, dust/sand storms, icing conditions, ice storms, or the like, the holes of the suction support structure 24 can be covered by the solid area 36 of the movable sheet 22. The perforated portion 26 of the sheet is wound onto a roller and withdrawn into the wing for protection. The exposed surface in this case is the solid area 36 of the sheet 22, which is smooth, monolithic, and unperforated. The solid area 36 of the sheet 22 protects the holes 32 in the suction support structure 24 by covering them with the solid area of the sheet 22. The holes 34 in the sheet 22 are protected by withdrawing the porous area 26 of the movable sheet into the interior of the wing by rolling it onto a roller.

To return to laminar flow operation, the rollers 38 and 40 are rotated to scroll the sheet so that the porous area 26 overlies the suction support structure 24 with the perforations 34 in the sheet aligned with the perforations in the suction support structure 32. In the case of a porous suction support structure 24, no such alignment is required.

If in spite of the retraction of the sheet 22 or other factors the holes 34 do not remain clear, pressurized pulsed air applied through a long manifold can be utilized to clear the clogged holes. As shown in FIG. 7, a manifold 54 is within the vacuum plenum 52 located behind one row of holes 32 in the suction support structure 24. The manifold 54 is plumbed to a source of compressed air or other gas that can be blown through the adjacent holes to clean them. The compressed air or other gas can be supplied by the aircraft engines or by a separate blower or compressor. To clean other rows of holes on the porous area of the sheet 22, the sheet is moved by the rollers 38 and 40 to position the rows to be cleaned adjacent the manifold 54. High energy ultrasound within the pressure manifold can be used to enhance this hole-cleaning process. During boundary layer suction, vacuum would be supplied to the manifold 54.

In addition to protecting the suction support structure 24, the sheet 22 can also be used for other functions. As described in more detail below, the sheet 22 can be used for deicing the wing by applying a current through the sheet. This resistantly heats the sheet to a temperature where the ice melts. Also, hot engine gas or air may be used to heat the movable sheet 22 for deicing the wing. Alternatively, the sheet can provide a high-temperature outer skin for supersonic or hypersonic flight. Cooling can be provided by pumping cooling air, fuel, or other fluid through the holes 32 and 34. Also, the contour of the wing can be varied by deforming the sheet into a desired shape to either change the aerodynamic shape of the wing or to dislodge ice. This is accomplished by inflating a fluid bladder, 52 that is positioned under the sheet 22, as shown in FIG. 24.

Figure 10:
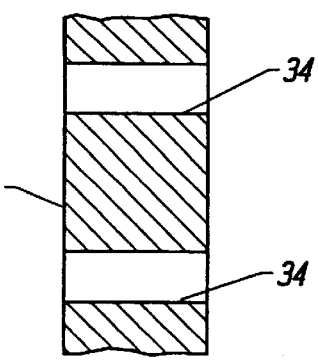
FIG. 10 is a sectional view of a movable sheet.

The holes 34 in the porous area of the sheet 22 can be fabricated by a number of methods such as chemical milling or etching, laser drilling, punching, drilling, some combination thereof, or other means. Laser beams can be used to simultaneously drill or ablate holes through both sides of the sheet 22. The laser beams are precisely aligned on both sides of the sheet so that the resulting through holes 34 are straight and aligned, as shown in FIG. 10.

Figure 11:
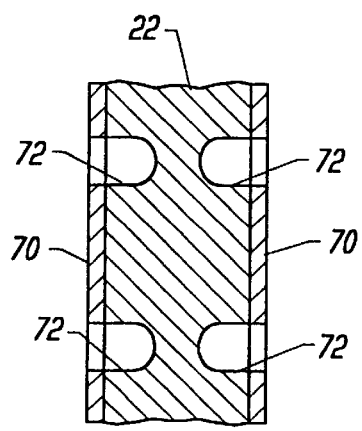
FIG. 11 is a sectional view of a movable sheet during an intermediate step in a hole fabrication process.
Figure 12:
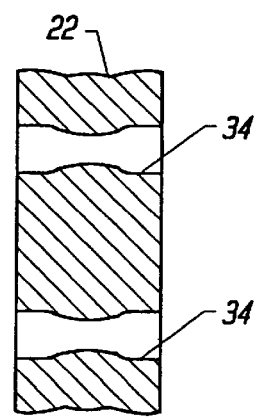
FIG. 12 is a sectional view of the movable sheet of FIG. 11 after completion of the hole fabrication process.

Alternatively, the porous area of the sheet 22 can be fabricated by combining laser machining or photolithography with an etching process. As shown in FIG. 11, the sheet 22 is covered on both sides with a protective polymer layer 70. Lasers then "drill" partially through both sides of the sheet 22, forming depressions 72 that penetrate less than half the thickness of the sheet. Next, in a second process, the remaining material is etched out chemically, removing the center of the sheet. The protective layers 70 are then removed, leaving the perforated sheet with through holes 34, as shown in FIG. 12. The chemical etching rate can be increased by various means such as: (a) passing a current through the sheet and thereby heating it; (b) ultrasonically agitating the etching solution; and (c) making the hole larger on one side than on the other side of the sheet.

Figure 13:
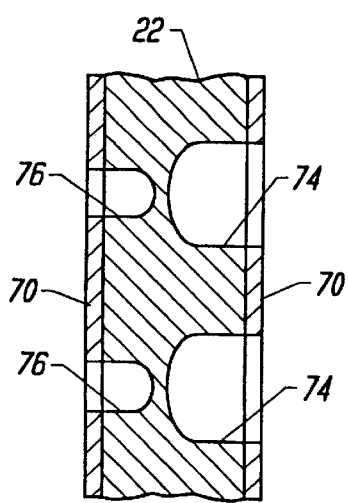
FIG. 13 is a sectional view of a movable sheet during an intermediate step in a tapered hole fabrication process.
Figure 14:
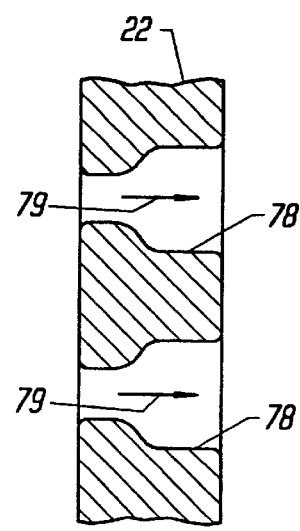
FIG. 14 is a sectional view of the movable sheet of FIG. 13 after completion of the tapered hole fabrication process.

A variation of this process is illustrated in FIGS. 13 and 14. As shown in FIG. 13, the sheet 22 is covered on both sides with a protective polymer layer 70. Lasers then drill partially through both sides of the sheet 22, but the depressions 74 on one side are greater in size than the depressions 76 on the other side. This can be accomplished by higher energy lasers and/or larger beam sizes to form the larger depressions 74. Then, the remaining material is etched out chemically and the protective layers 70 are removed. The resulting tapered holes 78 are larger in diameter on one side than the other, as shown in FIG. 14. The term "tapered" as applied to hole 78 is understood to mean a hole having different diameters at the two edges of the hole, without particular regard to the shape of the interior of the holes.

The tapered holes 78 are positioned on the wing with the larger diameter facing the inside of the wing. The airflow through the tapered holes 78 is in the direction of arrow 79 of FIG. 14. The smaller diameter of the tapered holes 78 is preferably in the range of 0.001 to 0.012 inches, while the larger diameter of the tapered holes is preferably in the range of 0.002 to 0.029 inches.

There are several reasons why the tapered holes 78 are advantageous for this application. First, the resistance of the holes to the air flowing therethrough is reduced by the tapered effect, which reduces the energy required to suck air through the sheet 22. Second, relatively small diameter holes in a relatively thick sheet can be fabricated at low cost. Third, the alignment of the tapered holes 78 with the holes 32 of the underlying suction support structure 24 is easier. Fourth, the alignment of the two lasers that "drill" the opposite sides of the hole is also easier.

Figure 15:
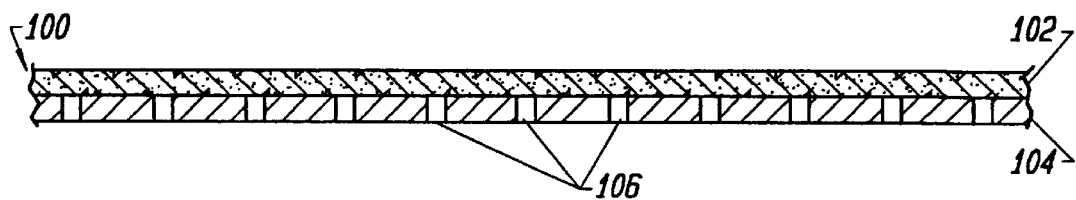
FIG. 15 is a sectional view of an alternative construction of the movable sheet.

FIG. 15 illustrates an alternative construction of a hybrid movable sheet 100 that adds a porous layer 102 on the outer surface of a perforated sheet 104. This hybrid movable sheet 100 is composed of a perforated supporting sheet 104 on which a porous layer 102 is attached or deposited. Air flows through both the porous layer 102 and the perforated sheet 104 and into the plenum 52 during boundary layer suction. The underlying wing structure, suction support structure 24, has a perforated or porous structure as described above. The surface of the hybrid movable sheet 100 that contacts the underlying structure 24 can be coated with an antifriction coating of a low coefficient of friction material, such as teflon, PTFE, TFE, silicon-impregnated aluminum, teflon-impregnated materials, plastics, and low-friction-coefficient metal alloys, or the like. Holes 106 in the perforated sheet may be round or rectangular in shape. The porous layer 102 can be fabricated from Dynapore-type materials, or by sintering nickel alloys, cobalt alloys, stainless steels including alloy 316L, copper alloys or aluminum alloys. The porous layer 102 can also be fabricated from plastic materials, including composites. The perforated sheet 104 can be made from the same materials described above with respect to sheet 22, including stainless steel, nickel-chrome alloys, nickel alloys, non-ferrous alloys and titanium alloys.

Figure 16:
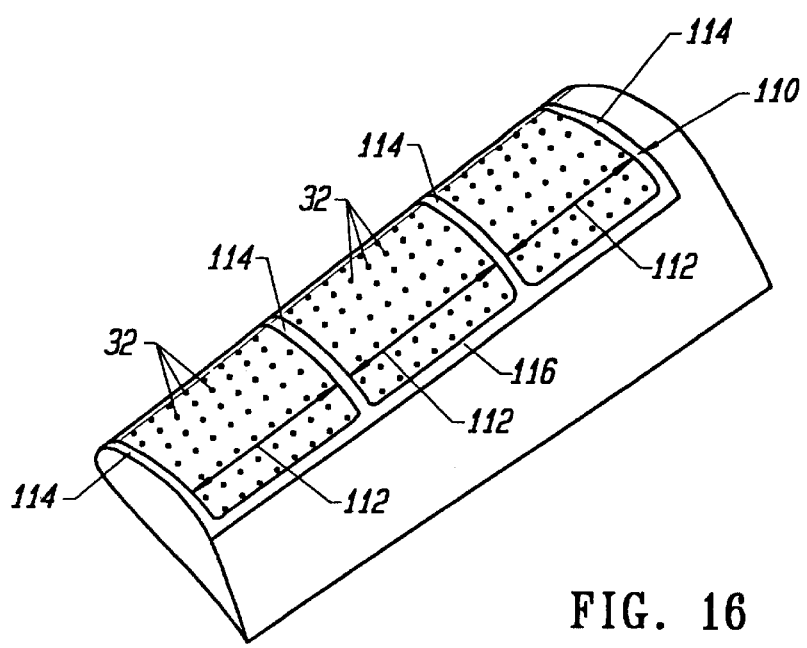
FIG. 16 is a perspective view of a laminar flow wing having an alternative movable sheet that incorporates cutout areas.

FIG. 16 illustrates another alternative construction of the movable sheet 110. Instead of having many perforations 34 that are aligned with the holes 32 in the underlying suction support structure 24, the alternative movable sheet 110 has large-area cutouts 112 that expose the underlying holes in the suction support structure 24. Straps 114 connect a solid rear edge 116 of the movable sheet 110 to a solid front edge that is rolled onto the front roller, in the position shown in FIG. 16. FIG. 16 shows the movable sheet 110 in position to enable boundary layer suction through the uncovered holes 32 to promote laminar flow. When it is desired to protect the holes 32 by covering them with the solid area of the movable sheet, the cutouts 112 are scrolled onto the rear roller and the solid area is scrolled from the front roller to a position overlying the holes. In effect, the cutout area serves as the porous area of the movable sheet because it permits boundary layer suction when the cutout area overlies the suction support structure.

Figure 20:
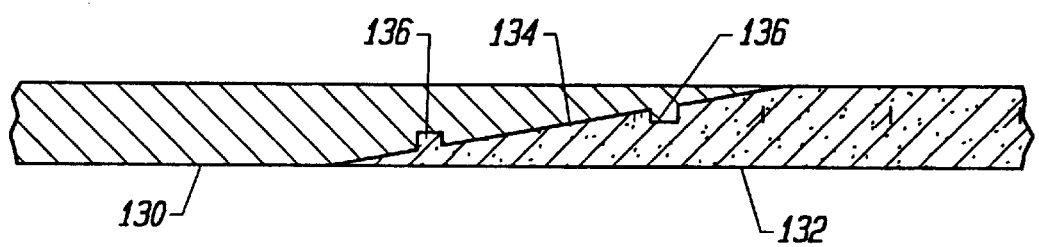
FIG. 20 is a detail sectional view of an alternative movable sheet.

FIG. 20 illustrates still another embodiment of the movable sheet, which includes a solid area 130 bonded to a porous area 132 by means of a tapered joint or splice 134. The solid area 130 is preferably composed of metal, such as nickel-chrome alloy, stainless steel, titanium alloy, or other metal or metal alloy. The porous area is preferably composed of a woven or composite material fabricated from silicon carbide, Kevlar, carbon fibers, or other permeable composite or sintered materials such as nickel alloy or cobalt alloy. The solid area 130 and porous area 132 are bonded together at the joint or splice 134, which preferably has interlocking projections and notches 136 to increase tensile strength.

Figure 21:
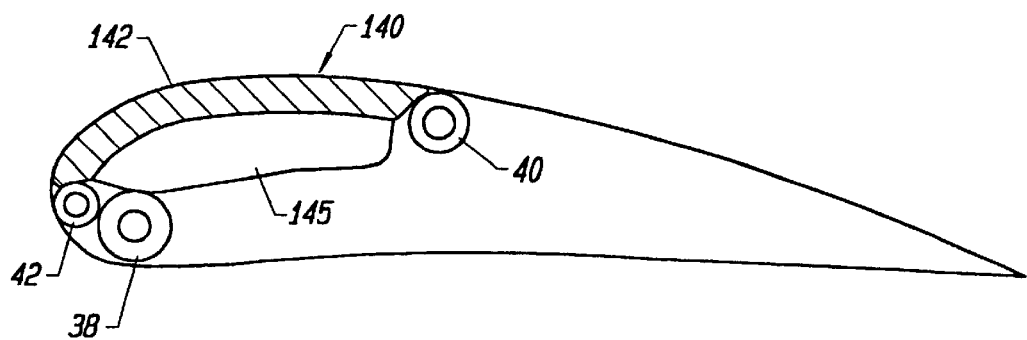
FIG. 21 is a sectional view of an alternative suction support structure.
Figure 22:
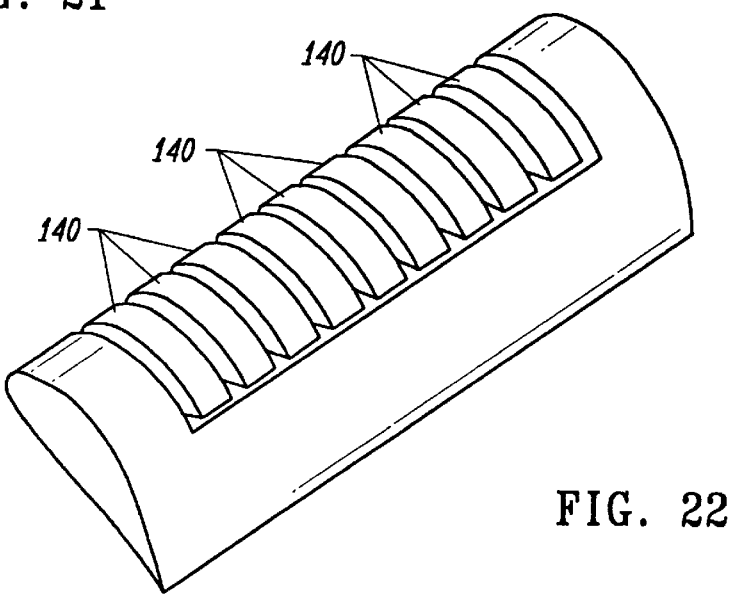
FIG. 22 is a perspective view of a wing incorporating the alternative suction support structure of FIG. 21.
Figure 23:
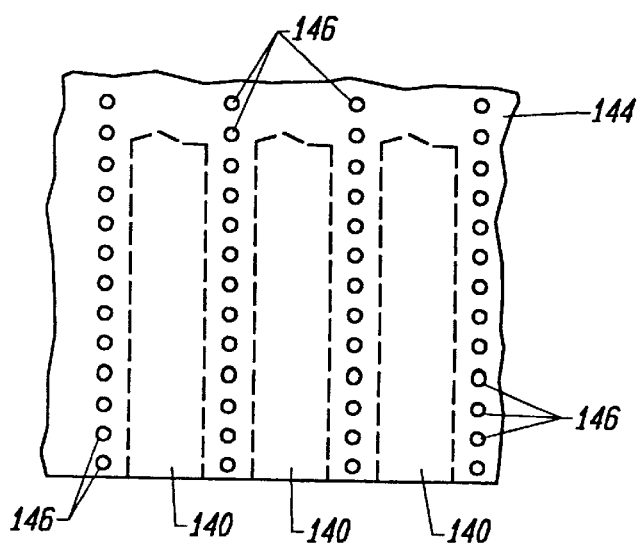
FIG. 23 is a detail plan view of a portion of a wing incorporating the alternative suction support structure of FIG. 21.

FIGS. 21–23 illustrate an alternative construction of the suction support structure 24 that has spaced-apart structural elements instead of a continuous structure composed of solid material, as shown in FIGS. 3–4. Spaced-apart support ribs 140 define the suction support structure. The ribs 140 have an upper surface 142 that conforms to the airfoil shape and that supports the overlying movable sheet 144. Below the ribs 140 is a plenum 145. The ribs 140 are interconnected structurally by stringers or spacers (not shown) that extend spanwise and are supported internally within the wing. When the porous area of the movable sheet 144 overlies the ribs 140, holes 146 in the sheet are positioned in the spaces between the ribs.

Figure 17:
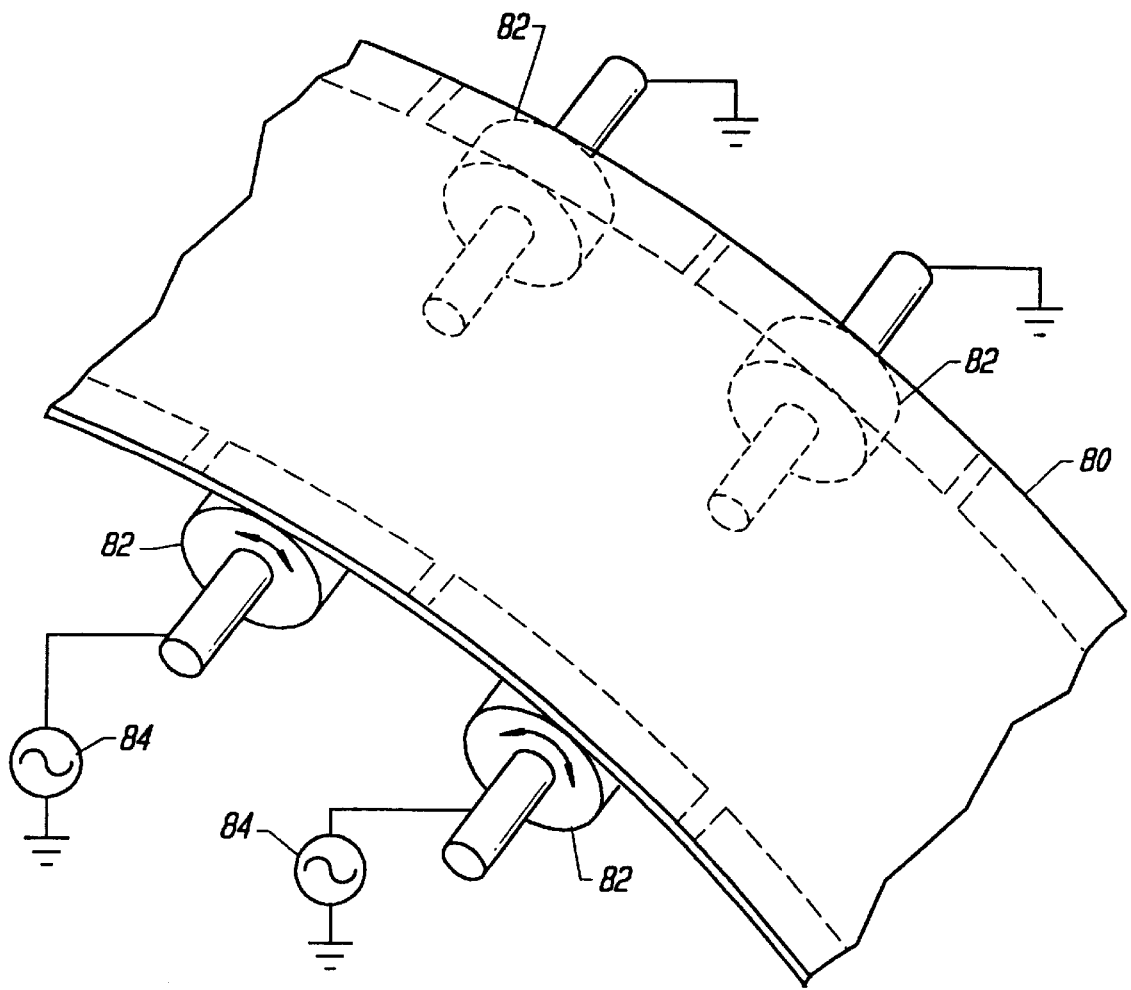
FIG. 17 is a perspective view of a wing having a deicing device according to the present invention, which can be the solid area of the movable sheet.
Figure 18:
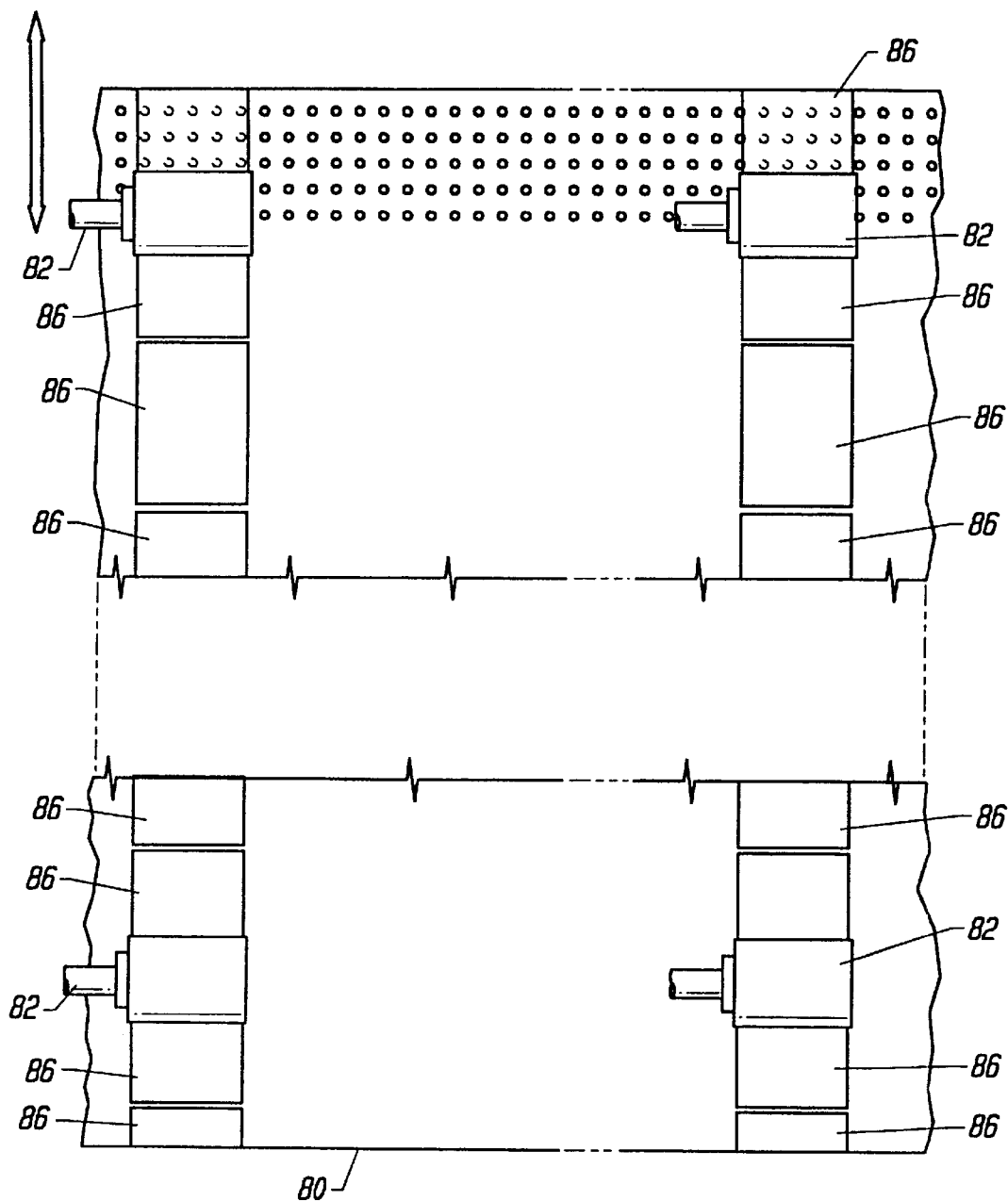
FIG. 18 is a view from inside the wing of the deicing device of the present invention.

The movable sheet of the present invention can also be used as part of a deicer system. As shown in FIGS. 17 and 18, the sheet 80 is composed of an electrically-conductive material and extends scroll-like between the two motor-driven rollers 38 and 40 (FIGS. 6 and 7) in the same manner as described above. A current is passed across the sheet 80 to heat it substantially above freezing temperature, thus melting the interface between the wing and any ice and/or snow on the wing. Electrical contact to the sheet 80 is made either by stationary contact pads or, preferably, contact rollers 82, which are shown in FIGS. 9, 17 and 18. A stationary contact pad (not illustrated) preferably has a contact surface made from a highly conductive material, such as carbon, precious metals, semi-precious metals, or metal alloys, maintained in contact with the sheet by a spring or compliant mounting. Alternating or direct current from a power supply 84 can be used. For example, a 28 volt DC system can be used to provide the electrical current for heating the deicing sheet 80. The contacts can be staggered in order to more uniformly heat the conductive sheet 80. This deicing concept can be used in any aircraft, with or without the laminar flow wing described above.

The sheet 80 can be made from nickel-chromium alloy, nickel-chromium steel, of other suitable electrically resistive, non-corroding and strong material. The electrical resistivity of these alloys is typically 5–195 microhm-centimeter.

To even more uniformly distribute the current and therefore the heat, and to make better electrical contact with the sheet 80, contact surfaces 86 of high-conductivity (low-resistivity) material can be provided at intervals along the edges of the sheet, as shown in FIG. 18. The contact material can be gold or other precious metal, copper, nickel, or other high-conductivity metal, alloy, or combination of metals to minimize contact corrosion and maintain low resistance. The contact surfaces 86 can be clad or plated onto the deicing sheet 80.

The sheet 80 is resistively heated by passing electric current in horizontal zones between two contact rollers. By having relatively high-conductivity (low-resistivity) contact surfaces 86 bonded to the sheet 80, separated by insulating gaps from adjacent contact surfaces, heating can be selectively achieved in desired zones. Limiting the heating to zones lowers the electric power requirements. Also, while heating power is applied, the sheet 80 can be moved by the motor-driven rollers in short reversing back-and-forth movements to dislodge ice accumulation that has been melted at the heated sheet interface.

Alternatively, hot engine gas or heated air may be used to heat the movable sheet 22 for deicing the wing. The hot engine gas or heated air is supplied to the plenum 52 and heats the movable sheet 22 as it flows outwardly through the holes 32 in the suction support structure 24 and holes 34 in the movable sheet. The movable sheet is composed of a thermally-conductive material, such as nickel-chrome alloy, stainless steel, titanium alloy, or other metal or metal alloy.

From the above description, it will be apparent that the invention disclosed herein provides a novel and advantageous movable sheet for creating laminar flow, or for use as a retractable shield for a laminar flow wing, and/or as an electrically-conductive substrate for a deicing device. The foregoing discussion discloses and describes merely exemplary methods and embodiments of the present invention. As will be understood by those familiar with the art, the invention may be embodied in other specific forms without departing from the spirit or essential characteristics thereof. For example, the movable sheet may be advantageously used in connection with boundary layer suction where the goal is high-lift rather than low drag through laminar flow. Furthermore, the movable sheet can be moved by numerous means other than rollers, including means such as hydraulic or air cylinders or linear electric motors. Accordingly, the disclosure of the present invention is intended to be illustrative, but not limiting, of the scope of the invention, which is set forth in the following claims.

What is claimed is:

1. A method of making a perforated sheet of metal comprising the steps of:

providing a sheet of metal having a protective polymer layer in contact with the metal on both sides thereof;

forming aligned depressions on both sides of the sheet of metal by removing selected portions of the polymer layer and underlying metal, wherein the depressions penetrate partially into but not through the metal, and then;

forming holes through the sheet of metal by removing metal between the aligned depressions until through holes are formed; and removing the polymer layers.

2. A method as recited in claim 1 wherein the step of forming aligned depressions includes removing selected portions of the polymer layer and underlying metal by a laser beam.

3. A method as recited in claim 2 wherein the aligned depressions are formed on both sides of the sheet of metal simultaneously by aligned lasers disposed on both sides of the sheet.

4. A method as recited in claim 1 wherein the step of forming depressions includes removing selected portions of the polymer layer and underlying metal by photolithography.

5. A method as recited in claim 1 wherein the step of forming holes includes removing metal between the aligned depressions by chemically etching to form the through holes.

6. A method as recited in claim 5 wherein the step of forming holes includes electrochemical etching by immersing the sheet of metal in an electrolyte and passing an electric current through the sheet of metal to electrochemically remove metal between aligned depressions to thereby form the through holes.

7. A method as recited in claim 6 wherein the step of passing an electric current through the sheet of metal includes resistively heating the metal to increase the rate of etching.

8. A method as recited in claim 5 wherein the step of chemically etching includes ultrasonically agitating a chemical etching solution to increase the rate of etching.

9. A method as recited in claim 1 wherein the step of forming holes includes removing metal between the aligned depressions by punching to form the through holes.

10. A method as recited in claim 1 wherein shaping of the holes is controlled to obtain a desired hole geometry suitable for a porous sheet used with laminar flow control.

11. A method as recited in claim 10 wherein the desired hole geometry is a tapered hole having a first diameter at one surface and a second diameter at the other surface, wherein the second diameter is at least 15% larger than the first diameter.

12. A method as recited in claim 11 wherein the first diameter is in the range of 0.001 to 0.012 inches, and wherein the second diameter is in the range of 0.002 to 0.029 inches.

13. A method as recited in claim 10 wherein the perforated sheet of metal has a porosity of between 0.4% and 55% based on the smallest diameter of the holes.

14. A method as recited in claim 10 wherein the sheet of metal has a thickness of between 0.002 and 0.050 inches.

15. A method of making a perforated sheet of metal comprising the steps of:

providing a sheet of metal having a protective polymer layer in contact with the metal on both sides thereof;

forming aligned depressions on both sides of the sheet of metal by removing selected portions of the polymer layer and underlying metal with aligned laser beams, wherein the depressions penetrate partially into but not through the metal, and then;

forming holes through the sheet of metal by chemically etching the aligned depressions until through holes are formed; and removing the polymer layers.

* * * * *